United States Patent [19]

Takahashi

[11] Patent Number: 4,610,390
[45] Date of Patent: Sep. 9, 1986

[54] BRAZING METHOD OF ALUMINUM

[75] Inventor: Susumu Takahashi, Yokohama, Japan

[73] Assignee: Kanto Yakin Kogyo Kabushiki Kaisha, Japan

[21] Appl. No.: 697,044

[22] Filed: Jan. 31, 1985

[51] Int. Cl.⁴ .............................................. B23K 31/02
[52] U.S. Cl. ...................................... 228/207; 148/23
[58] Field of Search ...................... 228/207; 148/23, 26

[56] References Cited

U.S. PATENT DOCUMENTS 3,951,328  4/1976  Wallace et al. ...................... 228/207
4,475,960 10/1984  Yamawaki et al. ................... 148/26

FOREIGN PATENT DOCUMENTS 2391803  1/1979  France ................................ 228/223
  27037  2/1983  Japan .
1055914  3/1964  United Kingdom .

Primary Examiner—Nicholas P. Godici
Assistant Examiner—Samuel M. Heinrich
Attorney, Agent, or Firm—Shlesinger, Fitzsimmons & Shlesinger

[57] ABSTRACT

A method of brazing aluminum articles in a continuous furnace, to which a step for producing fluoride fluxes is incorporated. An aqueous suspension of $KAlF_4$ is produced continuously and in situ in the system of the method by the reaction of starting materials, $Al(OH)_3$, HF, and KOH, and the suspension as it is produced or with the dilution by water is sprayed over the articles which move through the furnace.

1 Claim, 1 Drawing Figure

BRAZING METHOD OF ALUMINUM

BACKGROUND OF THE INVENTION

This invention relates to a method of brazing aluminum or aluminum alloy materials.

More particularly, in a method of brazing aluminum products in which fluoride fluxes which are not hygroscopic after brazing and are not corrosive against aluminum are employed for removing oxidized films from surfaces of the aluminum or aluminum alloy products and hard solders for brazing them, this invention is to provide a step in which the fluoride fluxes are produced continuously and in situ with stable compositions and with high productivity, and which enables the brazing method to be completely continuous.

As a flux for brazing aluminum materials which is not corrosive against aluminum, fluoride fluxes have been used. They are fluorides of a melting point of about 565° C. to about 575° C. containing a simple substance of $KAlF_4$ or $K_3AlF_6$. They are generally produced by (a) mixing KF and $AlF_3$ powders to obtain a paste which is in turn dried, or (b) heating powders of KF and $AlF_3$ to a molten mixture which is pulverized after having been cooled and solidified.

The above conventional method (a) can be represented by a method described in U.K. Pat. No. 1,055,914, in which $AlF_3$ of 53–55% and KF of 47–45% both of which are powder forms are made to a paste by adding thereto water and stiring them, and they are dried at a temperature below 200° C. It is held that in this method (a), $AlF_3$ and KF can hardly complete their reactions since $AlF_3$ is hardly soluble to water. Reaction products of this method (a) are accordingly not stable at their compositions. They have drawbacks that when they are made to an aqueous suspension, KF which has not reacted forms a solution whereby a brazing temperature easily varies.

The above-mentioned conventional method (b) is described for example in Japanese patent publication No. 58-27037, in which in order not to have KF remained unreacted, powders of $AlF_3$ and KF are mixed, heated, and melted. The molten mixture is pulverized after solidified.

These methods (a) and (b) can hardly be incorporated into a brazing method as a step thereof which can produce a flux in situ in the continuous brazing method, because the method (a) can hardly give a flux of a stable and constant composition whereby a brazing temperature has to be changed frequently, and the method (b) relies upon a batch production which does not match with a continous brazing operation.

BRIEF SUMMARY OF THE INVENTION

Compared to the above-described conventional methods in which the starting materials are reacted inevitably to a mass which has to be dried or pulverized before their use as fluxes, starting materials are reacted in this invention method in situ and directly to an aqueous suspension which is readily employable as fluxes in the method. The starting materials in this invention are $Al(OH)_3$, HF, and KOH. Their reaction is represented by the following reaction formula (1).

$$Al(OH)_3 + 4HF + KOH = KAlF_4 + 4H_2O \tag{1}$$

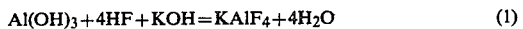

The reaction product which is an aqueous suspension of $KAlF_4$, is employed in a brazing method by spraying it to aluminum or aluminum alloy materials to be brazed, or by having the materials immersed in the suspension.

PREFERRED EMBODIMENT OF THIS INVENTION

Figure 1:
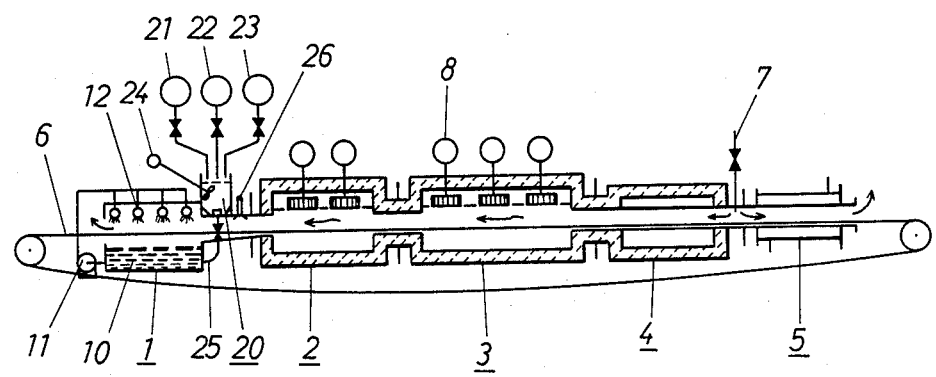
FIG. 1 is an explanatory cross sectional view of a continuous aluminum brazing furnace embodying the method in accordance with this invention.

With reference to the accompanying drawing, to a flux applying chamber 1, there is attached a flux producing chamber 20. The chamber 20 has a tank 21 for $Al(OH)_3$, a tank 22 for hydrofluoric acid, HF, and a tank 23 for a KOH solution. The starting materials supplied from the tanks 21, 22, 23, to the flux producing chamber 20 are mixed by an agitator 24 to promote their reactions. The reaction product which is an aqueous suspension 10 is supplied to the flux applying chamber 1 via a supplying pipe 25.

In this embodiment of the invention, predetermined amounts of $Al(OH)_3$ and HF are supplied from the tanks 21, 22 to the chamber 20 so that they make a molar ratio 1:4. Hydrogen fluoride was supplied by means of a solution containing about 20 weight % of HF. They, viz. $Al(OH)_3$ and HF were agitated and reacted at a temperature below 90° C., preferably 90° C. to 80° C. Their reaction represented by the following reaction formula (2) is exothermic, in which hydrolytic amount is 17.8 $H_2O$.

$$Al(OH)_3 + 4HF = HAlF_4 + 3H_2O \tag{2}$$

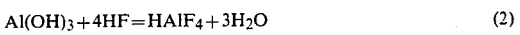

To this reaction composition in the chamber 20, there was supplied an aqueous solution of KOH of 20 weight % from the tank 23 until the composition with KOH presented pH 7. This reaction is represented by the following formulat (3).

$$HAlF_4 + KOH = KAlF_4 + H_2O \tag{3}$$

The hydrolytic amount of the reaction by KOH is 12.5 $H_2O$. The resultant product was a white suspension of $KAlF_4 + 34.3 \ H_2O$ and of 16.8 weight %.

The suspension may be added by water so as to be thinner and readily applied over various configurations of aluminum materials to be brazed. The suspension 10 such as 3–10% suspension thus made is circulated by a pump 11 and sprayed from showers 12 over aluminum materials travelling on an endless conveyor belt 6. Excess amount of flux applied over the materials is blown off by a blower 26. The materials are successively dried in a drying chamber 2 at about 300° C. And, then, they travel through a temperature elevation chamber 3, a brazing chamber 4 of about 610° C., and a cooling chamber 5, whereby they are subjected to a flux applying step, drying step, temperature elevation step, brazing step, and cooling step for the completion of brazing. Into the chambers, there are supplied $N_2$ gas from a gas atmosphere supply pipe 7, whereby a dew point in the brazing chamber 4 is made −30° to −50° C. Numeral 8 in the drawing indicates agitator fans for the $N_2$ gas atmosphere.

As explained and described above, fluxes are produced in this invention in situ and as one of links of the brazing steps. The fluxes produced thereby as an aqueous suspension are utilized as they are produced in a continuous brazing process. In addition to such advantageous points, it shall be noted alos that grain sizes of the fluoride fluxes made in accordance with this invention method are particularly fine compared to those obtained by the conventional methods, because the former is made by the molecular growth by chemical reactions, while the latter grain sizes are dependent on mechanical pulverization. The fluxes produced in this invention can therefore advantageously be employed as they are without any further processing thereof, for the sound and fine brazing of aluminum products.

I claim:

1. In a method of brazing aluminum products as they pass a brazing station, and which comprises continuously and successively performing a flux applying step, a drying step, a temperature elevation step, a brazing step, and a cooling step at said station, the improvement characterized in that an in situ flux producing step is performed substantially simultaneously with the flux applying step, said flux producing step comprising continuously mixing and reacting $Al(OH)_3$ and HF at a temperature between 80° C. and 90° C. to obtain a reaction composition, mixing KOH with the reaction composition until this mixture reaches a pH7, and with or without the addition of water to said mixture, using said mixture in the flux applying step as a flux produced in situ.

* * * * *